United States Patent Office 3,320,970
Patented May 23, 1967

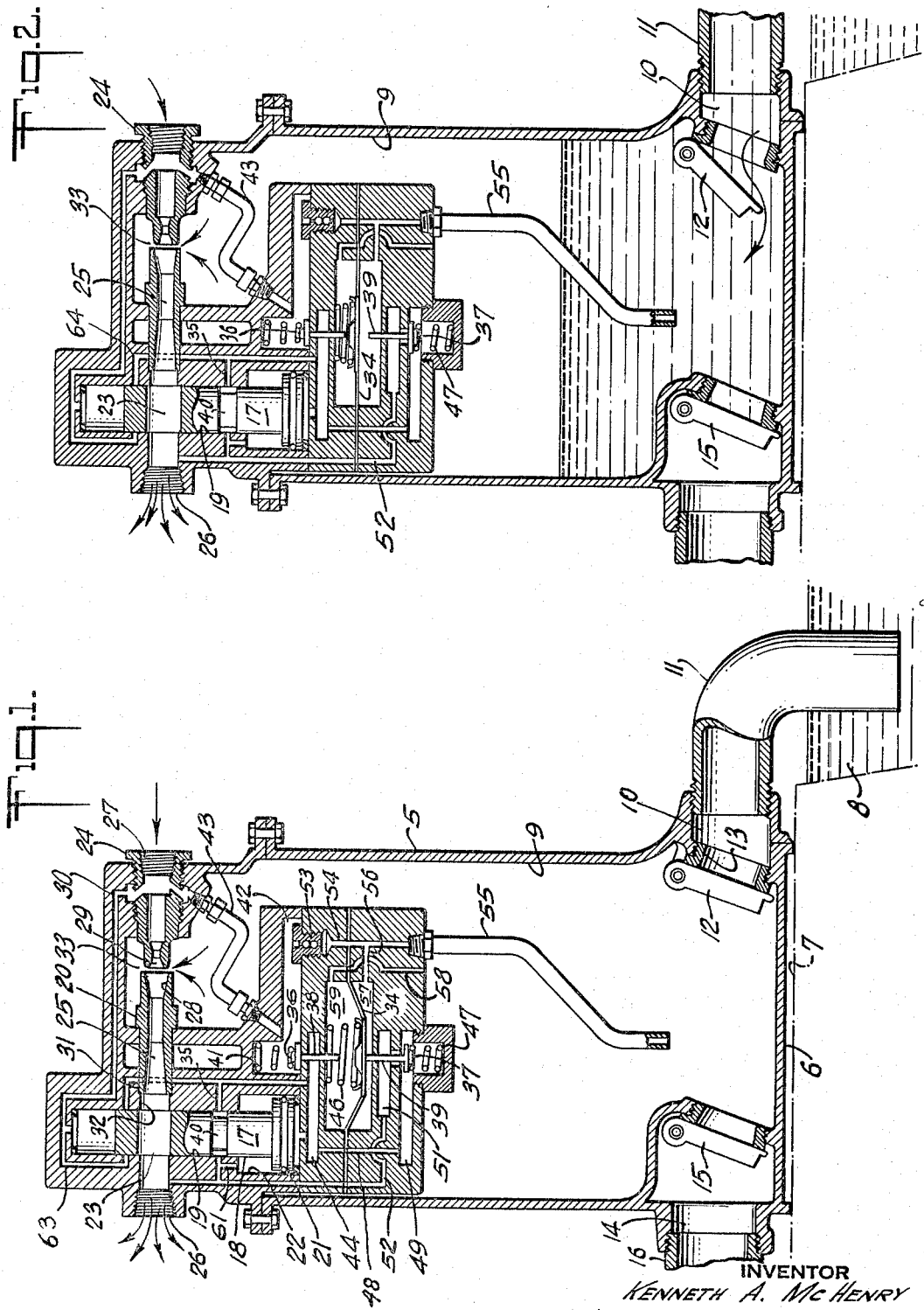

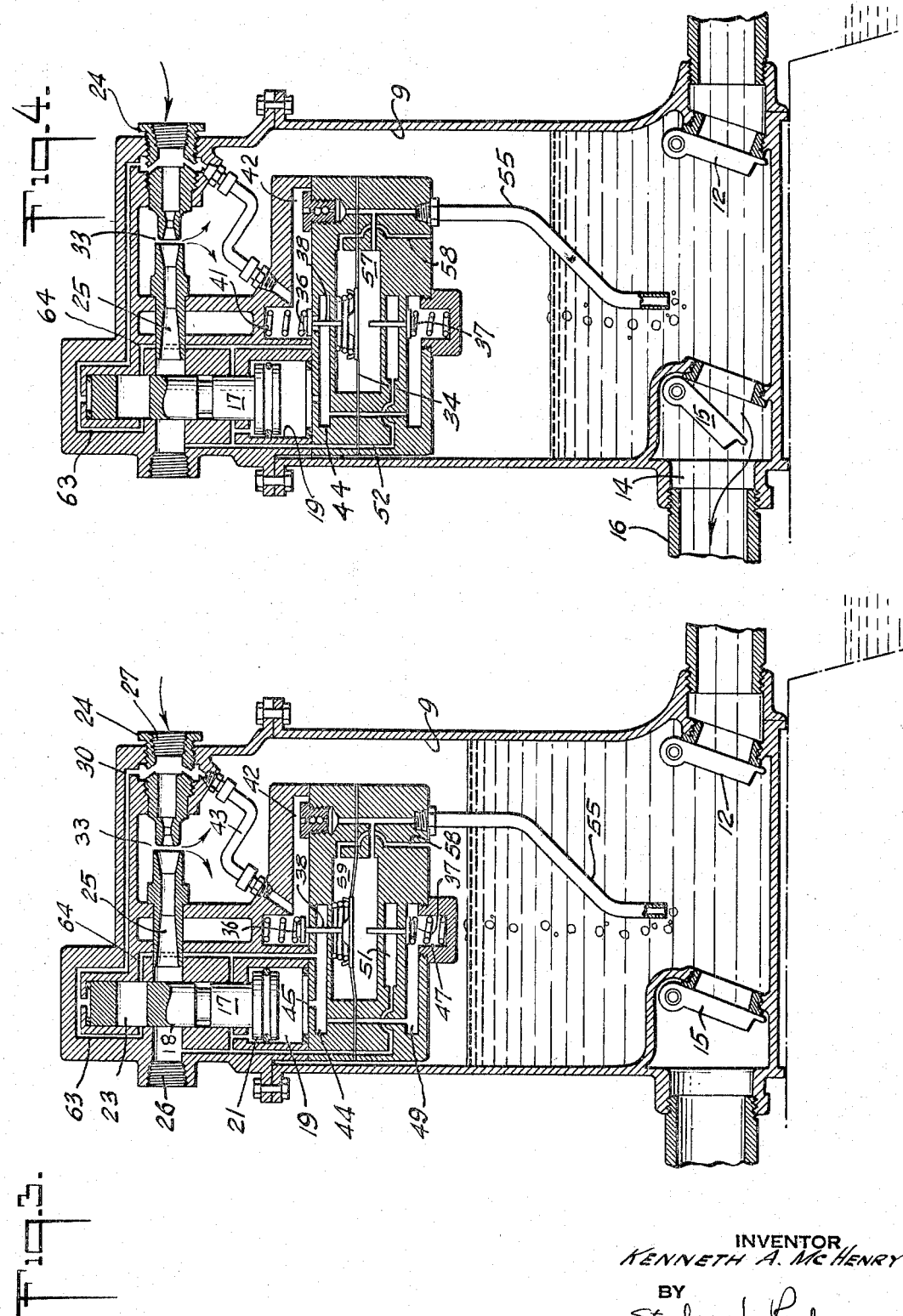

3,320,970
LIQUID LEVEL RESPONSIVE CONTROL VALVE PRESSURE ACTUATOR
Kenneth A. McHenry, Clinton, N.Y., assignor to Chicago Pneumatic Tool Company, New York, N.Y., a corporation of New Jersey
Filed Aug. 5, 1965, Ser. No. 477,419
2 Claims. (Cl. 137—403)

ABSTRACT OF THE DISCLOSURE

Apparatus including a check valved pneumatic displacement liquid accumulating tank, a nozzle-venturi system for producing vacuum or pressure within the tank, a main control valve for alternate selection of vacuum or pressure for the tank, and a liquid level responsive pressure actuator for the control valve.

---

The invention relates to the art of liquid level responsive pressure actuators for control valves.

A check valved pneumatic displacement tank including a nozzle-venturi system and a control valve associated with the system for alternate selection of vacuum or pressure for the tank is known from U.S. Patent No. 2,141,427, as having a float for actuating the control valve. Float actuators used in apparatus of this type have various mechanical disadvantages associated with the operation of the float actuator; such as sticking of the float and mechanical linkage. The present invention avoids these disadvantages by employment of a liquid level responsive pressure actuator for the control valve.

In accordance with the invention a liquid level responsive pressure actuator is provided for causing the shifting of a control valve from a normal position in a valve chamber to a reverse position, comprising diaphragm means biased over one area relative to a slide valve to vent the control valve chamber below the valve in a normal position of the valve, and which diaphragm means is responsive to back pressure developing as a consequence of liquid rising in a tank to a certain level to cause the vent valve to close and to cause a live air supply valve to open so as to feed live air to the main control valve to shift it to its reverse position.

In the accompanying drawings:

FIGS. 1–4 disclose in schematic, progressive stages of a cycle of operation of a siphon type sump pump embodying the invention;

FIG. 1 discloses an initial stage in the operation of the pump in which a low pressure vacuum condition is caused to develop in a water chamber of the housing;

FIG. 2 discloses a second stage of operation in which sump water is drawn because of the low pressure condition into the water chamber, and progressively rises therein;

FIG. 3 discloses a third stage of operation in which the sump water has risen to a predetermined level, and high pressure air is being directed into the water chamber to discharge the water; and FIG. 4 discloses the final stage of operation in which the sump water is being progressively discharged.

For a more detailed understanding of the invention reference is now directed to the FIGURES of the drawings. The pump illustrated therein includes an upright housing 5 having a base or bottom end 6 adapted to rest upon a level surface 7 adjacent a water sump 8. The housing provides a water or liquid accumulating chamber 9 having a side inlet passage 10 connected with a sump conduit or hose 11 depending into the water of the sump. This passage is controlled by a one-way heavy check valve 12 to allow sump water to flow into chamber 9. The check valve is hinged to a fitting 13 screwed into the inlet passage. It swings inwardly of the housing to open condition, as in FIG. 2, and is inclined so as to normally close under its own weight over the inlet passage, as in FIG. 1. A discharge passage 14 located adjacent the bottom of the water chamber opens through the side of the housing to the outside. This discharge passage is controlled by a one-way hinged heavy check valve 15 similar to valve 12 but arranged so as to swing outwardly of the housing to open condition, as in FIG. 4. It is also inclined so as to normally close under its own weight to seal over the discharge passage, as in FIG. 1. The discharge passage is connected with a drain or discharge hose 16.

Pneumatically operable control mechanism mounted in the upper end of the housing functions to cause sump water to be alternately drawn into and discharged from the water chamber 9. This mechanism includes a main valve 17 having a stem 18 slidable in a valve chamber 19, and further having an enlarged piston end 21 slidable in an enlargement 22 of the valve chamber. This main valve has a normal low position as in FIG. 1 wherein a transverse hole 23 in its stem connects an exhaust passage 25 and a high pressure air flow nozzle 24 with an exhaust port 26; and this valve has a reverse upper position, as in FIG. 3, wherein the exhaust passage 25 is blocked off from the exhaust port 26.

The nozzle is screwed into the housing; it has an enlarged mouth 27 connectable with a steady source of high pressure air. The exhaust passage 25 is defined by means of a conduit 20 fitted fast in the housing in axial alignment with the nozzle. The exhaust passage has a flared mouth 28 disposed in close spaced relation to a relatively reduced flared exit end 29 of the nozzle. An opposite end 31 of the conduit 20 extends into a bore 32 opening into the valve chamber 19 in opposed axial relation to the exhaust port 26. It is to be noted that the diameters of the exhaust port 26, valve hole 23, bore 32 and the exhaust passage 25 are of greater diameter than the issuing end 29 of the nozzle. The foregoing arrangement permits rapid passage of a jet stream from the nozzle through the exhaust passage and valve hole to the exhaust port without development of undesirable eddy currents at the clearance 33 between the nozzle and the exhaust passage. As this jet stream flows at high velocity from the nozzle across the clearance 33 to the exhaust passage, air trapped in the water chamber 9 is rapidly sucked or drawn through the clearance 33 by the jet stream and carried with the latter to the exhaust port 26. As a consequence of this action, a low pressure or substantial vacuum condition develops in the water chamber 9 causing water to be drawn, as a result of differential pressure developing over opposite areas of the inlet valve 12, from sump 8 through the inlet valve 12 into the water chamber. A branch passage 30 from the nozzle serves to conduct high pressure air to the top end of the valve chamber 19 to normally hold the main valve in its low position, as in FIG. 1.

When the main valve 17 is shifted from its low position to its reverse position, as in FIG. 3, the exhaust port 26 is blocked by the valve stem 18 from the exhaust passage 25. As a consequence of this condition, pressure air issuing from the nozzle flows through the clearance 33 into the water chamber to pressurize the latter and cause water previously drawn therein to be discharged through the discharge valve 15.

Diaphragm controlled means is provided in the housing. It is responsive to a predetermined pressure developing in the water chamber, accordingly as the water level rises or drops therein to a predetermined degree, to automatically cause shifting of the main valve 17 from one position to the other. This means includes a pressure responsive spring biased diaphragm 34 movable in a diaphragm chamber relative to a pressure air control slide element or valve 36 and an opposed slide element or venting valve 37. Each of these valves or elements has a stem, one being designated 38 and the other 39, slidably projecting into the diaphragm chamber relative to opposite sides of the diaphragm. A closing spring 41 normally holds valve 36 closed. When valve 36 is closed, as in FIG. 1, it blocks flow of high pressure air from a pressure air chamber 42 to a chamber 44. Chamber 42 is connected by a tube 43 with a side of the nozzle; and chamber 44 is connected by a port 45 to the bottom end of the main valve chamber 19. The pressure of air in chamber 42 supplements spring 41 in normally holding slide valve 36 closed. The diaphragm has a normal condition, as in FIG. 1, under the bias of its spring 46, wherein it presses against the valve stem 39 to hold the venting valve 37 open against the resistance of a return spring 47. In the open condition of the venting valve 37 the bottom end of the main valve chamber 19 is connected with a vent pasage 52 through chamber 44, a passage 48, a further chamber 49, valve 37, and a chamber 51 connected with the vent passage 52. Pressure air supplied to chamber 42 from tube 43 is metered in a steady stream through a restricted orifice 53 and a restricted passage 54 to a control or sensor tube 55. The latter depends into the water chamber to a point short of its bottom. The control tube is open at its bottom end. A side branch 56 from passage 54 connects with the diaphragm chamber area 57 below the diaphragm; and a relief passage 58 connects the upper area 59 of the diaphragm chamber with the water chamber 9. The upper area of the enlargement 22 of the main valve chamber above the piston 21 is connected by a relief passage 61 with the vent pasage 52 to avoid air resistance to shifting of the main valve.

The pump is shown in FIG. 1 in its normal condition preparatory to operation. In operating the device, high pressure air is continuously fed from a suitable source into nozzle 24. From the latter it flows in part through passage 30 to the top end of the main valve chamber 19 to hold the main valve 17 in its low position; air also flows in part through tube 43 to chamber 42 where it supplements the spring 41 in holding valve 36 seated, and from where it is metered in a steady stream through orifice 53 into the control tube 55 and to the diaphragm chamber area 57 below the diaphragm. Further, a large volume portion of the entering air issues in a jet stream from the nozzle and passes rapidly and at high velocity across the clearance 33 through the exhaust passage 25, and the hole 23 of the main valve to the exhaust port 26. As a result of the latter action a low pressure or vacuum condition progressively develops as earlier explained, in the water chamber 9 causing sump water, as indicated in FIG. 2, to enter the water chamber through the inlet valve 12. The discharge valve 15 is held shut at this time under its own weight supplemented by atmospheric pressure.

Next, as the level of the water arises in the water chamber above the open bottom end of the control tube 55, as in FIG. 2, a back pressure of air developing over the tube 55 and passage 56 communicating with the area 57 beneath the diaphragm progressively increases to force or raise the diaphragm clear of the valve stem 39, allowing spring 47 to close valve 37. The main valve 17, however, continues to remain "locked" in the down position since the bottom end of the main valve chamber 19 is still connected to vent through passage 35 around the peripheral undercut 40 in main valve 17 to vent passage 52. The diaphrgm chamber 59 is connected by passage 58 to chamber 9 above the water level. Accordingly, the diaphragm has a differential pressure acting upon it equal to the head of water above the end of the sensor tube 55. As the water continues to rise, the diaphragm moves toward valve stem 38. When the water reaches a predetermined level, as in FIG. 3, the diaphragm force is sufficient to open valve 36.

Upon opening of valve 36, as in FIG. 3, pressure air entering chamber 42 from tube 43 flows through valve 36 to chamber 44. From the latter it flows in part to chamber 49 below the venting valve 37 so as to supplement the spring 47 in holding the venting valve closed. It also flows from chamber 44 through port 45 to the bottom end of the main valve chamber 19 where it acts upon the piston end 21 of the main valve. The bottom area of the piston being relatively greater than that of the top end of the main valve stem, the differential pressure of air acting upon the piston shifts the main valve upwardly to its upper position, as in FIG. 3. Shifting of the main valve upward, as earlier explained, blocks air flow from the exhaust passage 25 to the exhaust port 26, whereupon the high pressure jet stream issuing from the nozzle is caused to flow through the clearance 33 to fill and pressurize the water chamber 9 above the water.

Continued pressurization of the water chamber 9 by high pressure air flowing from the nozzle progressively forces the water from the housing through the discharge valve 15, as in FIG. 4. As the water level drops, pressure below the diaphragm in area 57 also drops, so that the diaphragm is progressively moved downward by its return spring to clear the stem 38 of control valve 36, causing the latter to close under the force of its return spring 41, as in FIG. 4. This latter action shuts off flow of pressure air from chamber 42 to the bottom end of the main valve chamber 19. However, the main valve 17 remains "locked" in its upper position after control valve 36 closes, because of the pressure air connection from passage 63 through the transverse hole 23 and the restricted passage 64 to chamber 44 which connects to the bottom of the main valve chamber 19 through port 45. As the water level in the water chamber 9 continues to drop further, the diaphragm 34 engages the stem of the venting valve 37 and, as the water level drops below or close to the end of the control tube 55, the diaphragm forces valve 37 to open. Whereupon this action, the bottom end of the main valve chamber 19 is connected to the vent passage 52; and the pressure air being applied over the branch passage 30 to the top end of the main valve 17 causes the latter to shift downward to its low condition, as in FIG. 1, preparatory to the start of a new cycle of operation. The pump continues automatically to cycle and recycle in this manner until the operator shuts off the supply of air to the entering nozzle, or until the sump is substantially pumped out.

It is to be appreciated that the main valve 17 together with the associated nozzle 24 and exhaust passages 26, 23, 25 functions as an illustrated means for causing entry and discharge of liquid from the chamber 9. It is also apparent that the pressure responsive diaphragm arrangement 34, 57, 59 and the associated elements 36, 37 arranged in the chamber 9 could also be arranged externally of the chamber.

What is claimed is:

1. In apparatus including a main control valve chamber, and a main control valve operable in the chamber having a normal position at one end of the chamber and being pneumatically shiftable to a reverse position, a liquid level responsive pressure actuator for the control valve comprising: a liquid accumulating tank, a vent control slide valve for connecting the main control valve chamber below the main control valve to vent, a live air supply control slide valve for connecting the main control valve chamber below the main control valve with live air to shift the main control valve to its reverse position, a separate spring biasing each slide valve to closed condition, a pressure responsive diaphragm controlling opening and closing of said slide valves, a spring normally biasing the diaphragm against the vent control slide valve so as to hold the latter open, and means for developing a back pressure over the non-biased area of the diaphragm as a consequence of a predetermined rise of liquid in the tank to shift the diaphragm against the resistance of its spring clear of the vent control slide valve and into abutment with the live air supply control slide valve to open the latter.

2. In apparatus including a check valved pneumatic displacement liquid accumulating tank, a nozzle-venturi system for producing vacuum or pressure within the tank, and a main control valve operable in a valve chamber for alternate selection of vacuum or pressure for the tank, the valve being biased to a normal position at one end of the chamber and being shiftable to a reverse position, the improvement comprising: a liquid level responsive pressure actuator for the control valve comprising: a vent control slide valve for connecting the main control valve chamber below the main control valve to vent, a live air supply control slide valve for connecting the main control valve chamber below the main control valve with live air to shift the main control valve to its reverse position, a separate spring biasing each slide valve to closed condition, a pressure responsive diaphragm controlling opening and closing of said slide valves, a spring normally biasing the diaphragm against the vent control slide valve so as to hold the latter open, and means for developing a back pressure over the non-biased area of the diaphragm as a consequence of a predetermined rise of liquid in the tank to shift the diaphragm against the resistance of its spring clear of the vent control slide valve and into abutment with the live air supply control slide valve to open the latter.

References Cited by the Examiner

UNITED STATES PATENTS

| | | | |
|---|---|---|---|
| 1,492,171 | 4/1924 | Jennings | 103—234 |
| 2,141,427 | 12/1938 | Bryant | 103—235 |
| 2,376,348 | 5/1945 | Fox | 103—235 |
| 2,717,516 | 9/1955 | Swift et al. | 73—220 |
| 3,055,386 | 9/1962 | Moore | 251—28 |
| 3,089,512 | 5/1963 | Julien | 251—29 |
| 3,104,678 | 9/1963 | Cole | 137—403 |

DONLEY J. STOCKING, *Primary Examiner.*

W. J. KRAUSS, *Assistant Examiner.*